United States Patent [19]

Hanan

[11] 3,853,416
[45] Dec. 10, 1974

[54] JOINT ASSEMBLY FOR A LOCK STRUCTURE

[76] Inventor: Abraham Hanan, P.O. Box No. 119, Brooklyn, N.Y. 11223

[22] Filed: May 14, 1973

[21] Appl. No.: 360,103

[52] U.S. Cl................... 403/322, 24/211 L, 63/12, 403/329, 403/361, 403/362, 403/377
[51] Int. Cl.............................................. F16d 1/06
[58] Field of Search.......... 24/108, 110, 211 L, 217, 24/218; 403/20, 319, 321, 326, 327, 329, 360, 361, 375, 322, 362, 377; 63/12, 13, 29 R; 287/DIG. 7; 74/530

[56] References Cited
UNITED STATES PATENTS

| 1,638,321 | 8/1927 | Burmister | 24/211 L |
| 1,911,935 | 5/1933 | Vidal | 24/211 L |
| 2,841,034 | 7/1958 | Greene, Sr. | 74/530 |
| 2,884,647 | 5/1959 | Cuttler | 24/217 |

FOREIGN PATENTS OR APPLICATIONS

| 741,157 | 2/1932 | France | 63/12 |
| 41,781 | 1/1933 | France | 63/12 |
| 804,853 | 8/1936 | France | 63/12 |

*Primary Examiner*—Jordan Franklin
*Assistant Examiner*—Conrad L. Berman

[57] ABSTRACT

In the present invention, in a preferred embodiment thereof, there is provided for the use in mounting jewelry ornamental stones or other pieces in jewelry settings, the setting itself onto a base member such as a broach, a bracelet, a ring, or the like. The preferred mechanism includes a receptacle structure defined on one of the opposing matable members and a shaft or male projection on the other, with the male projection having an engageable slot extending transversely of the shaft, and with the receptacle which is normally on the base member, defining a space which is sufficiently large to include an arcuate substantially horseshoe shaped spring structure which is biased inwardly and is engagable within the shaft slot when the shaft is slid therethrough, to thereby lock the shaft in the inserted position until such time as the opposing legs of the spring are prized apart, and there being present a wedge member which is movably mounted between the opposing legs of the spring such that upon the wedge member being moved forceably in a wedge manner between the legs of the spring, the legs of the spring are forced apart sufficiently for the shaft to be withdrawn, there being in the wall structure of the base in a preferred embodiment a very small aperture through which a small pin may be inserted in a manner in which pressure may be exerted against the wedge member in a suitable manner to cause by force thereupon the wedge member to slidably be forced in a wedging direction between the opposing legs of the spring. By virtue of this novel invention, there is provided a secure mechanism for attaching jewelry settings to a base, irrespective as to whether or not the spring member is mounted in the setting or whether or not the shaft extends from the setting, and the pin hole is sufficiently small as not to be noticeable to the unsuspecting eye of the consumer and yet provides a ready means for removing the setting of the ring or of the cuff-link, or the like.

7 Claims, 16 Drawing Figures

JOINT ASSEMBLY FOR A LOCK STRUCTURE

The present invention relates to a lock device for mounting of jewelry settings within particular base members.

BACKGROUND TO THE INVENTION

Prior to the present invention, there have existed in the jewelry field various mechanisms for attaching settings to base members but in most instances such mechanisms include means whereby the setting may be easily withdrawn without the necessity of removing any securing lock which makes it very possible that the setting could become lost accidentally at one time or another. A major reason for the lack of a locking mechanism heretofore of any suitable nature is because, at least in part, of the miniature size of the base and setting where they join together, and especially the requirement for aesthetically pleasing appearance to the eye, precludes previously the use of conventional locking mechanisms. The locking mechanisms heretofore provided were of a large and bulky nature and were not adaptable to the finer pieces of jewelry. Obviously the use of a large key-hole or any such device with a large key would not be aesthetically pleasing to the eye and would thereby totally defeat the utility of the piece as a jewelry piece. At the same time, in order to achieve a workable device, it is necessary for the mechanism thereof be sufficiently uncomplicated in its assembled structure and parts as to justify its use on low-cost jewelry as well as the finer jewelry. Additionally, aside from the utility of jewelry, it often is desirable to have secure means for attaching other shafts and receptacle pieces such as gear wheels and shaft on which it is mounted, or for different types of shafts for a single common screw-driver handle receptacle, or the like. The same would be true for a bit.

SUMMARY OF THE INVENTION

Accordingly, one or more objects of the present invention is to overcome one or more of the difficulties and problems and disadvantages as above noted, and particularly with regard to miniature locking devices such as might be used in jewelry, or electronic components of small size, but as well for large devices, where applicable.

Another object is to obtain a mating and locking structure and having new and desirable advantages.

A particular object of the invention is to obtain a jewelry-setting piece-mating and locking device.

Other objects become apparent from the preceding and following disclosure.

One or more objects of the present invention are obtained by the invention as defined herein.

Broadly the invention includes locking structures of the male-female types in which the male member includes a transverse slot or step such that upon insertion thereof into the female member a locking mechanism may lock into the slot or behind the step recessedly. The heart of the invention lies in a spring-locking key and a force element positioned adjacent to a leg of the spring with the spring being mounted within the female space and with the structure defining the female member including side walls at least one thereof having an aperture therein receivable of a key member such as preferably needle or pin shaft which shaft which inserted with sufficient force is pressible against the slidable member preferably of a wedge-type (shape) such that the slidable member is pressed against the spring leg to forceably move the leg of the spring away from the engaging position in the retention of the slotted or stepped member, thereby making possible the withdrawal of the slotted member past the pushed-back spring-locking-key, i.e., the spring leg. In a preferred embodiment of the invention, the spring is typically of an arcuate semi-circular or horse-shoe-shaped structure, with opposing legs positioned for spring-biased force inwardly and flexible outwardly from one-another. The legs are normally in a sufficiently close distance to one-another to engage opposite surfaces of a shaft being slid therebetween and to snap-inwardly into any slot or step along the surface of the shaft, whenever the shaft is inserted therethrough with the insertion of the shaft into the female member.

The male-female members of the present invention may optionally (1) be mounted as a part of jewelry setting or of the gear wheel, for example, and the other upon the base, or (2) alternatively, the male-female members may be reversed, with the female member as a part of the jewelry setting and/or the gear, for example. The same is obviously true for other embodiments of the invention.

The invention is particularly adapted to miniature-sized structures where it is desired that there be a locking mechanism to avoid accidental disengagement. Also, basically important to the entire utility of a jewelry piece, as noted above, the locking mechanism cannot be unsightly nor noticeable to the searching eye of the consumer. However, additionally, the utility of the present invention resides in the secure locking mechanism thereby provided and in particular the lack of any structures or mechansims which would interfere with the overall operation of the members being attached such as shaft and gear wheel or such as vises or boring members whether manual or machine-driven.

The invention may be better understood by reference to the following Figures.

THE FIGURES

FIG. 1 an in-part view of a shaft and a diagrammatic view of a locking base unit of the present invention in a side perspective view.

Figure 9A:
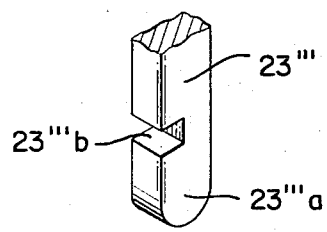
Figure 9B:
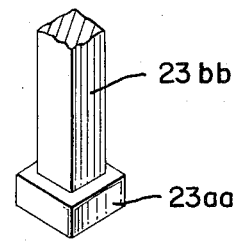

FIG. 9A and FIG. 9B each disclose alternative embodiments in in-part perspective view of differing male lock pins of the present invention.

Figure 10:
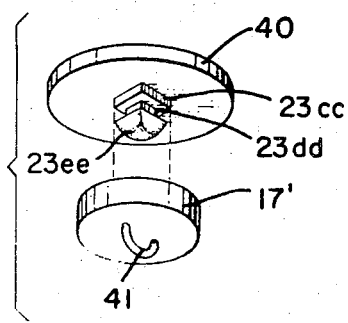

FIG. 10 illustrates an alternate utility of the present invention, showing a button in bottom perspective view.

Figure 11:
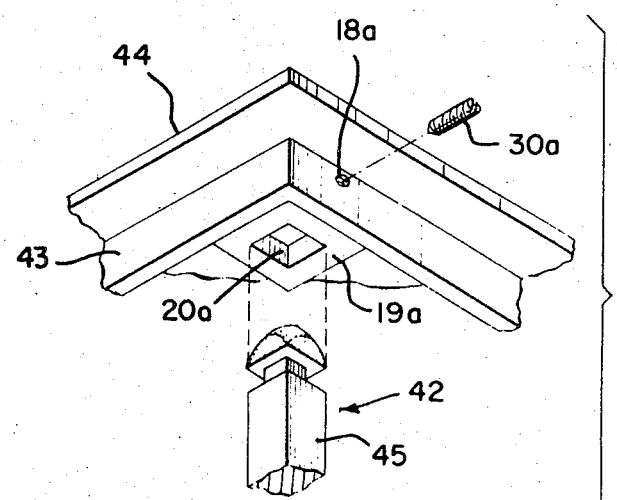

FIG. 11 illustrates still additional utility and embodiment of the present invention, illustrating in perspective bottom in-part view a table and a matable table leg.

Figure 12:
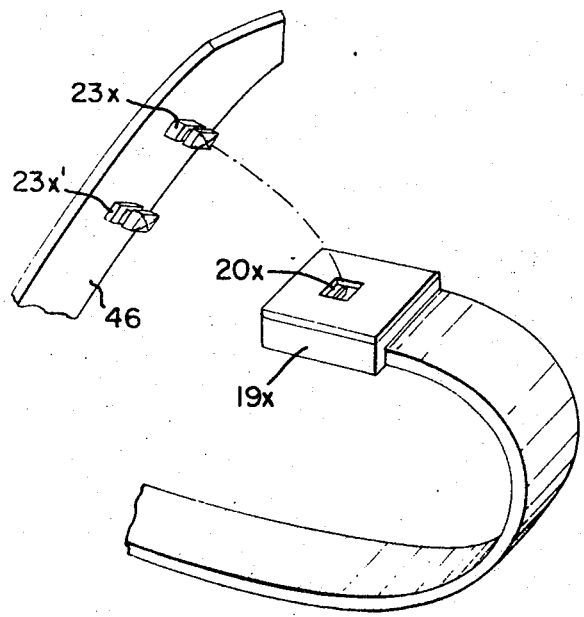

FIG. 12 illustrates in perspective side view still additional utility and embodiment of the present invention in the form of a belt strap.

Figure 13:
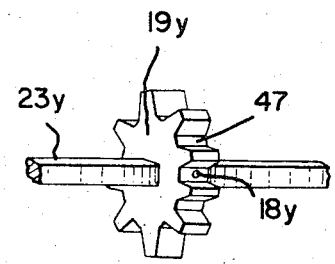

FIG. 13 illustrates a shaft and gear in an in-part side perspective view as an additional embodiment of the present invention.

Figure 14:
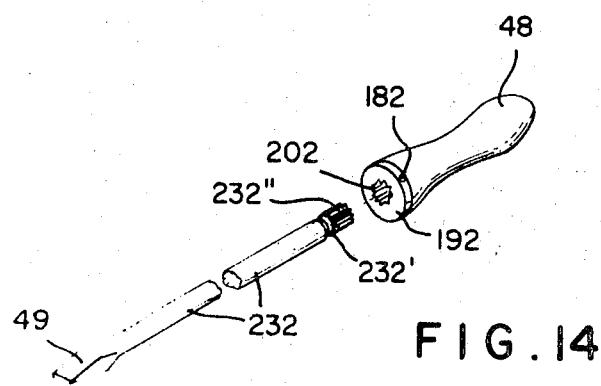

FIG. 14 illustrates still an additional embodiment of the present invention in side perspective view, being a screw driver with interchangable shafts each having different screw-driver tools on the distal end thereof, there being shown only a sole shaft and screw driver shaft-tool.

DETAILED DESCRIPTION OF THE INVENTION

Figure 1:
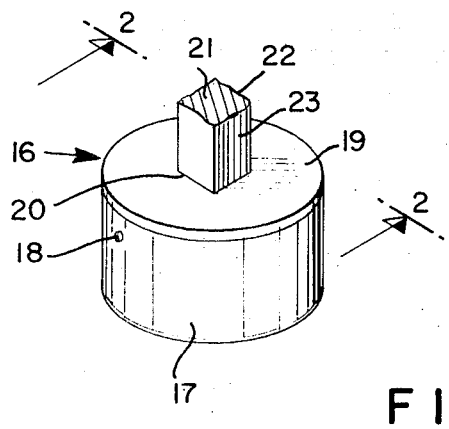
Figure 4:
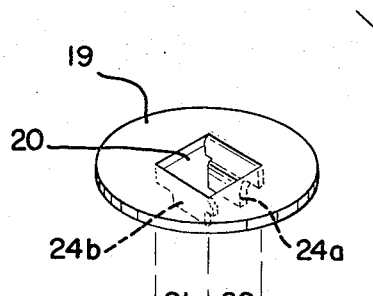
FIG. 4 illustrates a cross-sectional view as taken along lines 4—4 of FIG. 2.
Figure 4:
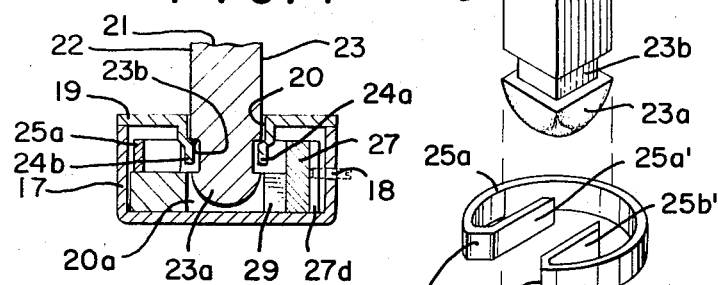
Figure 3:
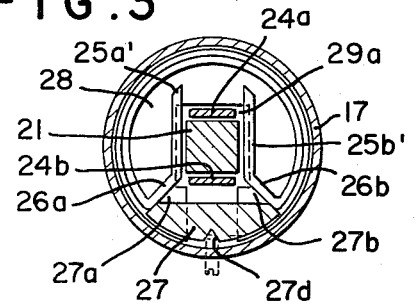
FIG. 3 illustrates a cross-sectional view of FIGS. 1 and 2 embodiment as taken along lines 3—3 of FIG. 2.
Figure 2:
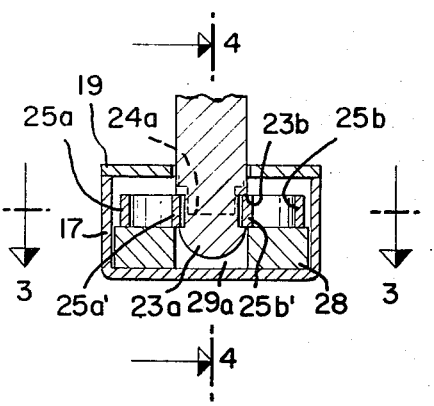
FIG. 2 illustrates a cross-sectional view of FIG. 1 embodiment as taken along 2—2 thereof.

Illustrating the principle of the invention, shown in the mated state, is a diagrammatically represented base-locking unit 17 and locked shaft therein—shaft 21, of a typical unit 16 of the present invention. In the wall of the base unit 17 there is an aperture (through-aperture) from outside to the interior space of the base unit 17, and there is a securing top lid structure 19, having a hole therein of a through-type 20, having downwardly extending flanges 24a and 24b (see FIG. 5), the locked-in shaft 21 having squared edges 22 and base 23. As taken along lines 2—2 of FIG. 1, FIG. 2 illustrates a side cross-sectional view of the elements noted above, additionally illustrating the shaft head 23a and the indentation 23b, and the space 29a of the receptacle, and the differing leg portions 25a, 25b, 25a' and 25b', as well as the base insert guide structure 28. FIG. 3 illustrates an elevational cross-sectional view as taken along lines 3—3 of FIG. 2 showing the spring locking member in elevation plan view and showing the locked base unit in cross-sectional view as to other elements, and the locked-in shaft in cross-sectional view, additionally showing the wedge unit 27 and the key-receiving indentation 27d thereof and wedge faces thereof 27a and 27b, and the lock-in spring diagonal wedge faces 26a and 26b. Also illustrated are the flanges 24a and 24b, and space 29a. In FIG. 4, in a view taken along lines 4—4 of FIG. 2, there is shown in side cross-sectional view the members previously recited above, this view additionally showing in side view movable wedge member 27, and its slot or indentation key-receiving portion 27b and the aperture 18.

Figure 5:
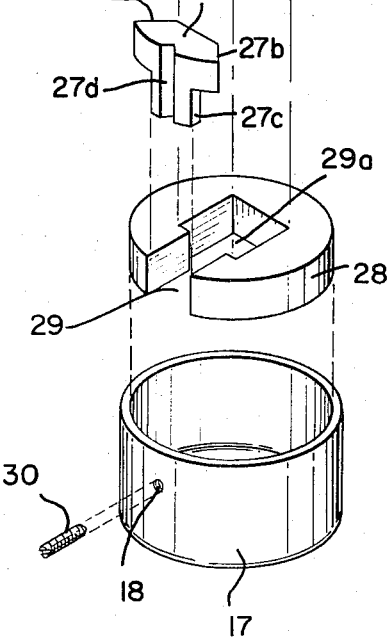
FIG. 5 illustrates an exploded perspective view of the embodiment of FIG. 1.
Figure 6:
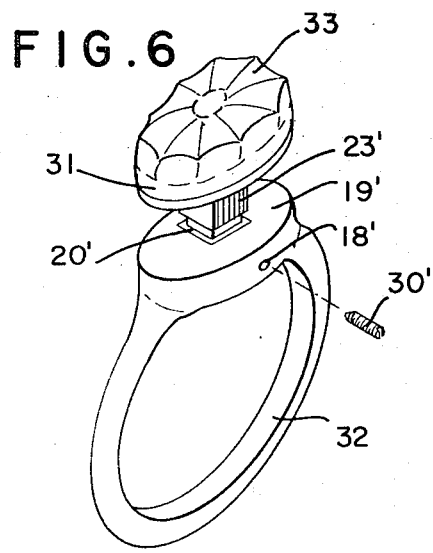
FIG. 6 illustrates in partially exploded view a finger ring ring base unit and in exploded view therefrom a jewelry setting and shaft thereof in side perspective view.

FIG. 5 illustrates the elements which have been recited above, but in greater detail being shown, as to clarity of shape. Additionally there is seen as part of the switch member 27, the downwardly-extending lock projection which serves to prevent the wedge member from shifting out of a predetermined alignment. Between the opposing legs of the member 28 is shown the space 29 in which the projection 27c normally is movable. Additionally, the FIG. 5 embodiment illustrates an additional unlocking element 30 in exploded view which is normally apart-from but is inserted into the aperture 18. In FIG. 6, there is shown an embodiment of the base unit 17 as the base of a crown of a ring having ring structure 32 and the unlocking key 30', and having mounted on the shaft 23' a jewelry setting structure 31 having set therein a stone 33 of a jewelry type. Other numbers correspond to corresponding items already identified previously.

Figure 7B:
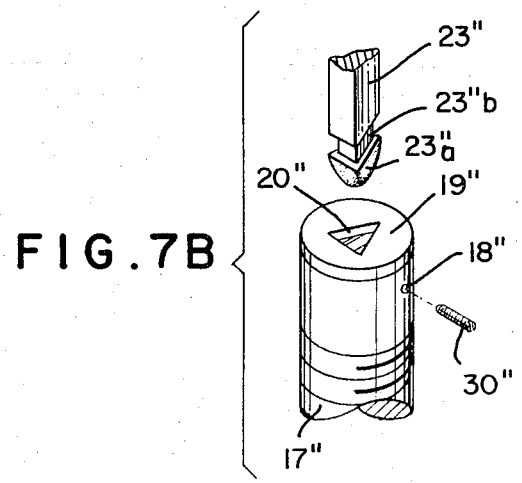
FIG. 7B illustrates another alternative embodiment in a view analagous to that of FIG. 7A, differing only in the fact that the female shaft and the receptacle of the male unit are each triangular in shape rather than circular in cross-section.
Figure 7A:
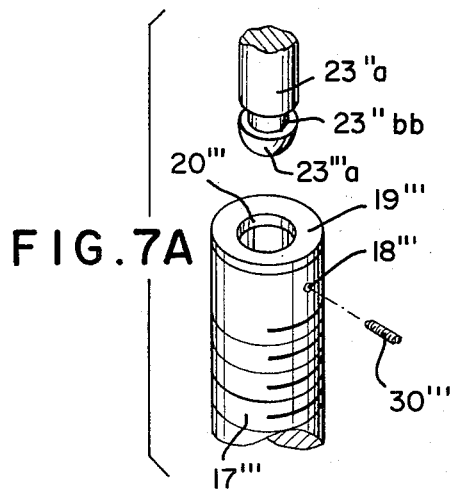
FIG. 7A illustrates a view comparable to that of FIG. 1 except with the base mounted on a shaft of some type, illustrating the female shaft and the male base unit in circular or rounded form as an alternative embodiment shown in side perspective view.

FIG. 7A illustrates an alternate embodiment to that of FIG. 1, showing the base unit mounted on an upper portion of a shaft, but the emphasis being on the rounded nature of the shaft 23'' and the rounded nature of the base 17''', and of the aperture 20'''. Correspondingly, the FIG. 7B has the aperture 20 of FIG. 1, has aperture 20'' of triangular shape and the triangular shaft 21'' (triangular cross-section).

Figure 8:
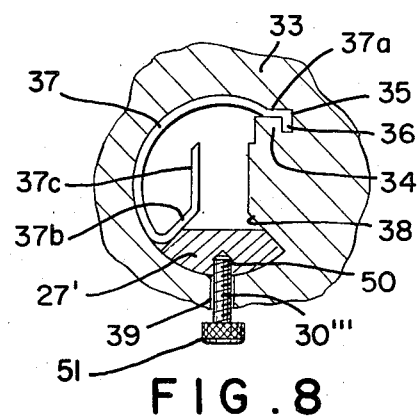
FIG. 8 illustrates an in-part view shown partially in cross-section, of an alternate embodiment in which instead of a two legged spring, there is a single legged spring.

In the FIG. 8 embodiment, a cross-sectional and elevational view of the lock-in spring member 37 is shown with an anchor-end 36 of the spring, locked into a shaped locking-recess-structure 34, and having the inclined face 37b, and the leg 37c, this embodiment basically illustrating the fact that there may be merely a single leg rather than necessarily two opposing legs as in the prior shown embodiments. This embodiment also illustrates the fact that the unlocking key 30''' may be mated with the wedge member 27' by matable male and female threads, and may have a button 51 on the distal end thereof, pressure applied to the button serving to move forward the wedge member 27'.

Each of FIGS. 9A and 9B illustrate alternate embodiments with the FIG. 9A illustrating the fact that the step does not have to necessarily extend all of the way around the periphery of the shaft but may as shown be in the form of a slot, or indentation from one edge, typically into which the single leg of the FIG. 8 embodiment would lock into. In like manner, FIG. 9B illustrates that it is merely the step down to the portion 23bb to the portion 23aa that is basically important in order to prevent the entire member shaft from being withdrawn, there not having to be a subsequent upwardly spaced enlargement or step-up of the shaft 23bb.

FIG. 10 illustrates a button arrangement embodiment of the present invention, of the type that would be mounted on a coat or shirt or any article on which a button is desirable for appearance or for fastening into a button-hole, the shaft being mounted on the button portion (in this embodiment, but it could be switched in an alternate embodiment) and the base unit 17' having a loop member 41 through which threads or a link may be inserted to mount the unit appropriately and/or conventionally, on an article.

FIG. 11 illustrates a table and table leg embodiment and is more or less self-explanatory, showing a table portion 44, the side of the table 43 with its aperture 18a, and the table leg 45.

In the FIG. 12 embodiment, this embodiment is also self explanatory, the belt buckle 19x having the aperture 20x receivable of optionally one of the mating heads 23x or 23x' of the belt portion 46.

In the embodiment of FIG. 13, there is shown a shaft and toothed-gear arrangement, having the shaft 23y and the gear 19y, with teeth 47 and the aperture 18y.

In the FIG. 14 embodiment, there is shown a screw driver embodiment in which the female unit is mounted on the handle as the male unit 192 with aperture 202 mounted on the handle 48, and the screw driver shaft 232 having the matable portion 232 and the step 232 and the desired screw driver end 49.

It is to be understood that the present invention with the preceding illustrations are merely intended to be illustrative of some of many possible embodiments of the present invention, and are not intended to unduly limit the invention, it being apparent that the generic concept is applicable to many different types of structures where a releasable mating relationship or locking relationship is desirable or required. Accordingly, it is within the scope of the present invention to vary the embodiment of the locking mechanism of the present invention and to make such modifications, variations, and substitution of equivalents as would be apparent to a person of ordinary skill.

I claim:

1. A lock device comprising in combination: an elongated squared shaft of substantially square cross-section defining along an elongated axis thereof an indentation slot defined by recessed substantially flat-faced upright recessed walls outwardly facing from one-another located adjacent and above a substantially horizontal substantially flat-faced step-wall preventing withdrawal of the shaft; a shaft-receiving hole-structure means defining a receptacle, said hole-structure means being substantially square in cross-section and surrounding a terminal end of the squared shaft and a pair of opposing downwardly-turned upright sidewardly inwardly-facing flat-faced channel-defining spaced-apart walls, said hole-structure means further defining an enclosure space; and key means including a unitary spring-annulus having at a first location substantially parallel radially inwardly extending spring-biasing locking-legs extending substantially horizontally and having substantially upright leg flat faces positioned on opposite sides of and substantially perpendicular to said pair of downwardly-turned upright flat faced walls such that the flat faces of the locking-legs extend substantially parallel to and snap against the opposite edges of said flat-faced channel-defining spaced-apart walls when the elongated squared shaft is inserted into the hole-structure means' receptacle, said enclosure space being defined by containing and substantially circumscribing walls of the hole-structure means, the unitary spring-annulus being loosely mounted within the enclosure space, the circumscribing wall having in a side wall thereof a key-aperture extending therethrough of small predetermined size having a key inserted therein, and a movably mounted slide-element mounted within the enclosure space mounted adjacent said spring annulus at said first location, one end of the slide element being substantially wedge-shaped and an opposite end thereof facing radially outwardly adjacent and opposite to an inner end of said key-aperture, the wedge-shaped end being positioned between a first predetermined part of the flat-faces of the locking-legs at said first location such that said key when inserted and pressed through said key-aperture causes said wedge-shaped end to press-apart the locking-legs from one-another as the slide-element is slid radially inwardly in a direction between the locking-legs whereby the shaft when already inserted may be removed.

2. A lock device of claim 1, in which said key means further includes (c) a track-slot-defining guide element of substantially rounded disk shape defining a through center channel extending uprightly of said square cross-section and further defining a radially outwardly extending slot aligned beneath said key-aperture, said slide-element including a downwardly-extending projection seated slidably within said slot slidable to and fro radially inwardly and outwardly guided within the slot.

3. A lock device of claim 2, in which mounted on a remaining end of the shaft is a jewelry-setting element.

4. A lock device of claim 2, in which mounted on a remaining end of the shaft is a gear means.

5. A lock device of claim 2, in which said hole means includes on a face away from the receptacle a jewelry-setting structure.

6. A lock device of claim 2, in which mounted on a remaining end of the shaft is a male-button element.

7. A lock device of claim 2, in which said hole means includes structure on which a belt strap is mountable; and including a belt strap mounted on said hole means, remaining end of the shaft being mounted on a remaining free end of the belt strap.

* * * * *